(12) United States Patent
Tan et al.

(10) Patent No.: US 10,652,647 B2
(45) Date of Patent: May 12, 2020

(54) HEAD-MOUNTED DISPLAY DEVICE

(71) Applicant: SHENZHEN ROYOLE TECHNOLOGIES CO. LTD., Shenzhen, Guangdong (CN)

(72) Inventors: Peng Tan, Guangdong (CN); Xiaofei Fan, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/332,105

(22) PCT Filed: Sep. 14, 2016

(86) PCT No.: PCT/CN2016/099106
§ 371 (c)(1),
(2) Date: Mar. 11, 2019

(87) PCT Pub. No.: WO2018/049623
PCT Pub. Date: Mar. 22, 2018

(65) Prior Publication Data
US 2019/0364355 A1 Nov. 28, 2019

(51) Int. Cl.
*H04R 1/10* (2006.01)
*G06F 1/16* (2006.01)

(52) U.S. Cl.
CPC ........... *H04R 1/1066* (2013.01); *G06F 1/163* (2013.01); *H04R 1/105* (2013.01); *H04R 1/1008* (2013.01);
(Continued)

(58) Field of Classification Search
CPC .............. H04R 2499/15; H04R 1/1008; H04R 1/1066; H04R 1/1091; H04R 1/105; G06F 1/163
(Continued)

(56) References Cited

U.S. PATENT DOCUMENTS

2017/0055061 A1* 2/2017 Yang .................. G02B 27/0176

FOREIGN PATENT DOCUMENTS

CN 102918443 A 2/2013
CN 202998408 U 6/2013
(Continued)

OTHER PUBLICATIONS

International search report dated Jun. 1, 2017 from corresponding application No. PCT/CN2016/099106.

*Primary Examiner* — Paul Kim
(74) *Attorney, Agent, or Firm* — Hauptman Ham, LLP

(57) ABSTRACT

A head-mounted display device includes a display unit projecting an image beam to user's eyes, thus enabling the user to see an enlarged virtual image, a headphone unit configured to transmit sound information to user's ears, and a connecting unit. The connecting unit is substantially C-shaped and defines a C-shaped opening. A middle portion of the connecting unit couples to the display unit. Two opposite sides of the C-shaped opening of the connecting unit couples to the headphone unit. The connecting unit includes an outer frame, a connecting assembly, and an inner frame. The connecting assembly includes at least two independent connecting members. The connecting assembly couples to the outer frame. The inner frame couples to the connecting assembly, and portions near the two opposite sides fix to the outer frame, thus sandwiching the connecting assembly between the inner frame and the outer frame.

9 Claims, 6 Drawing Sheets

(52) U.S. Cl.
CPC ....... *H04R 1/1091* (2013.01); *H04R 2499/15* (2013.01)

(58) Field of Classification Search
USPC .......................................................... 381/333
See application file for complete search history.

(56) References Cited

FOREIGN PATENT DOCUMENTS

| | | |
|---|---|---|
| CN | 103591414 A | 2/2014 |
| CN | 203675287 U | 6/2014 |
| CN | 204392512 U | 6/2015 |
| CN | 105302294 A | 2/2016 |
| CN | 105792052 A | 7/2016 |
| CN | 205408118 U | 7/2016 |
| CN | 105829950 A | 8/2016 |
| CN | 205450450 U | 8/2016 |
| JP | 2015126396 A | 7/2015 |
| JP | 2016099510 A | 5/2016 |

\* cited by examiner

HEAD-MOUNTED DISPLAY DEVICE

RELATED APPLICATION

The present application is a National Phase of International Application Number PCT/CN2016/099106, filed Sep. 14, 2016.

TECHNICAL FIELD

The present disclosure relates to a technical field of near-eye display, and more particularly to an immersive head-mounted display device.

BACKGROUND

Head-mounted display devices are electronic devices that use near-eye display technology to allow a user to see an enlarged virtual image. The head-mounted display device usually includes a housing, a display screen received in the housing, and a lens module matching with the display screen, which together constitute a display unit. An image beam emitted by the display screen is projected to the user's eyes by the lens module, thus allowing the user to see a virtual image. An existing head-mounted display device integrates a headphone, thus the user does not need an external earphone. When wearing the above-mentioned head-mounted display device, as the same manner as wearing the headphone, the user needs to pull two headphones open to increase a spacing between the two headphones and then wears the head-mounted display device to a head. During wearing, a portion of the display unit connected to the headphones is also deformed as the headphones are pulled open. In order to adapt to the above-described deformation, a peripheral of the outside housing of the display unit is designed to be similar to a head mounted structure of the head mounted headphone. However, this kind of head mounted structure is composed of a complete arc, thus a problem exists that a clamping force of the headphones to the user's ears is too large.

SUMMARY

The present disclosure aims to provide a head-mounted display device, which can effectively reduce a clamping force on the user's ears when wearing the head-mounted display device.

A head-mounted display device provided in an exemplary embodiment of the present disclosure includes a display unit projecting an image beam to user's eyes, thus enabling the user to see an enlarged virtual image; a headphone unit configured to transmit sound information to the user's ears; and a connecting unit. The connecting unit is substantially C-shaped and defining a C-shaped opening. A middle portion of the connecting unit couples to the display unit. Two opposite sides of the C-shaped opening of the connecting unit couples to the headphone unit. The connecting unit includes an outer frame, a connecting assembly, and an inner frame. The connecting assembly includes at least two independent connecting members. The connecting assembly couples to the outer frame. The inner frame couples to the connecting assembly, and portions near the two opposite sides of the connecting unit of the inner frame fix to the outer frame, thus sandwiching the connecting assembly between the inner frame and the outer frame.

Thus, in the head-mounted display device provided by the present disclosure, since the connecting assembly is composed of a plurality of independent connecting members, during the deformation process, an elastic force generated by the connecting assembly is much less than that generated by a integral connecting assembly, thus reducing the pull force required to pull two headphone elements apart or the clamping force of the connecting unit applied to the user when the user wears the head-mounted display device, and thereby being convenient for users to wear and improving the wearing comfort.

BRIEF DESCRIPTION OF THE DRAWINGS

The accompanying drawings are used in combination with the specific embodiments to illustrate each of the embodiments of the present disclosure in detail. It will be apprehended that, the elements illustrated in the drawings do not represent an actual size and proportion relationship, and are merely schematic diagrams for clearly illustrating, and should not be construed as limiting the present disclosure.

DETAILED DESCRIPTION

In order to make the purposes, technical solutions, and advantages of the present disclosure more clear, the present disclosure is further described below in detail with reference to several embodiments and the accompanying drawings. It will be apprehended that, the specific embodiments described herein are merely used to explain the present disclosure, and not intended to limit the present disclosure. In the specification and the claims of the present disclosure, in a component which is substantially C-shaped, a side facing a space enclosed by the C-shaped component is defined as an inside, while the opposite side is defined as an outside.

Figure 1:
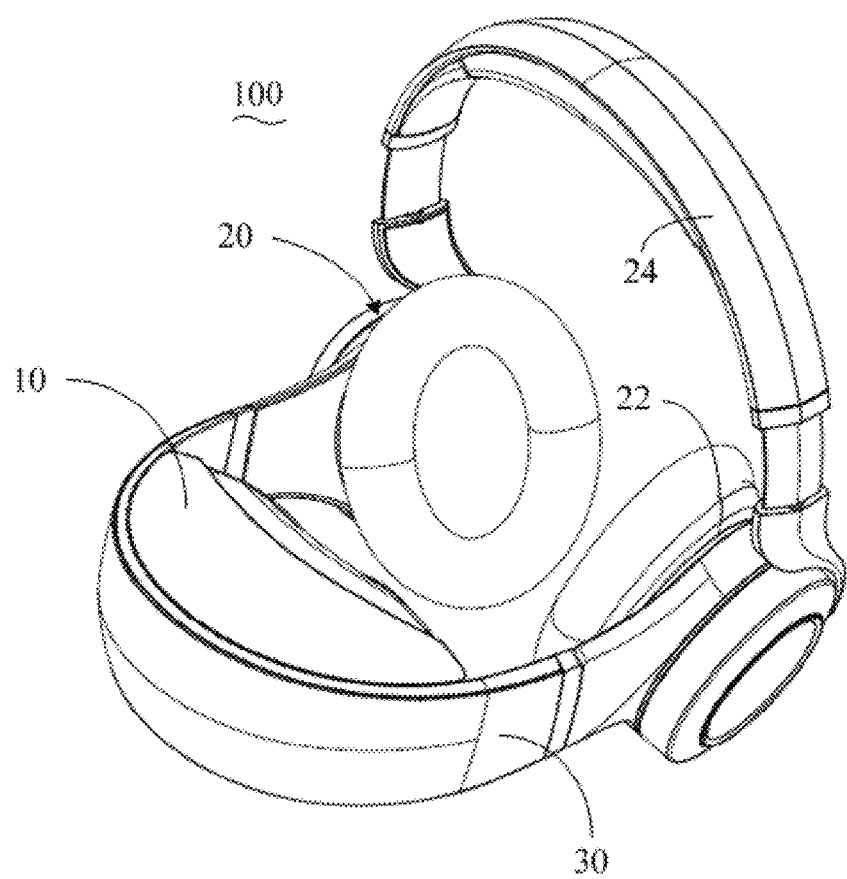
FIG. 1 is a schematic view of a head-mounted display device provided in a first exemplary embodiment of the present disclosure.
Figure 2:
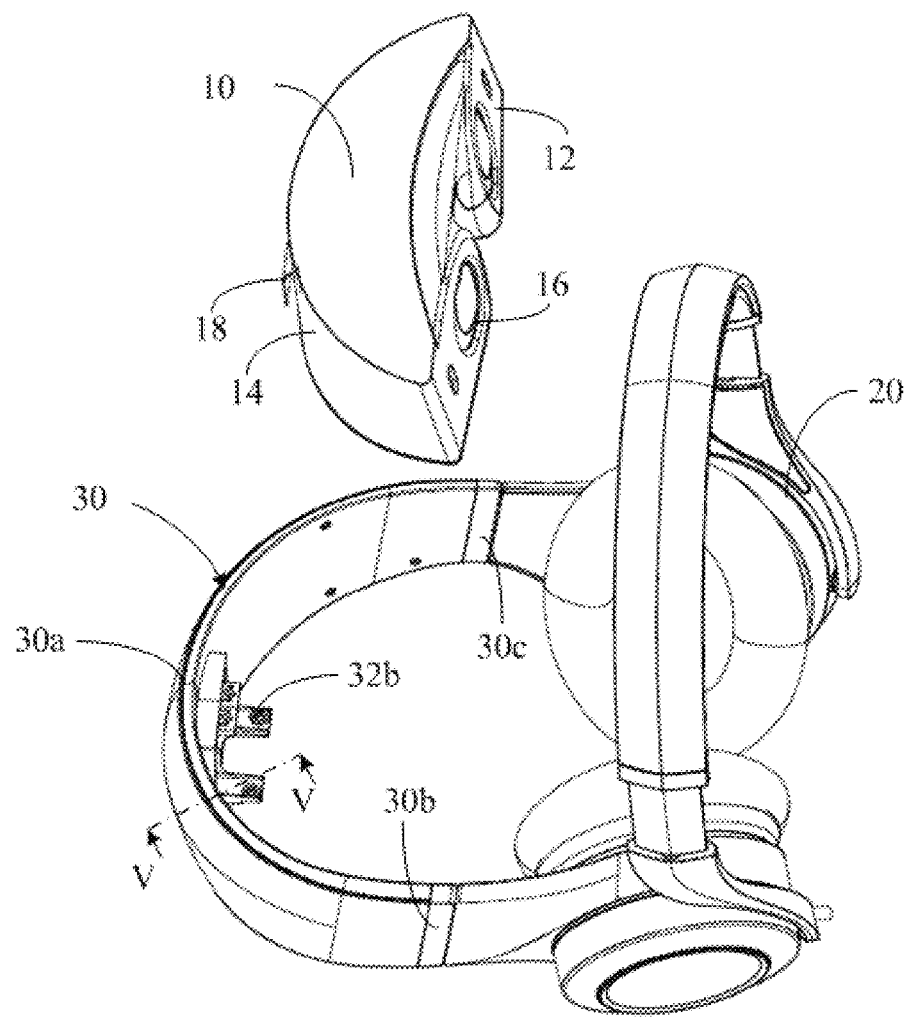
FIG. 2 is a schematic view of a separation of a display unit, a headphone unit, and a connecting unit of the head-mounted display device of FIG. 1.
Figure 7:
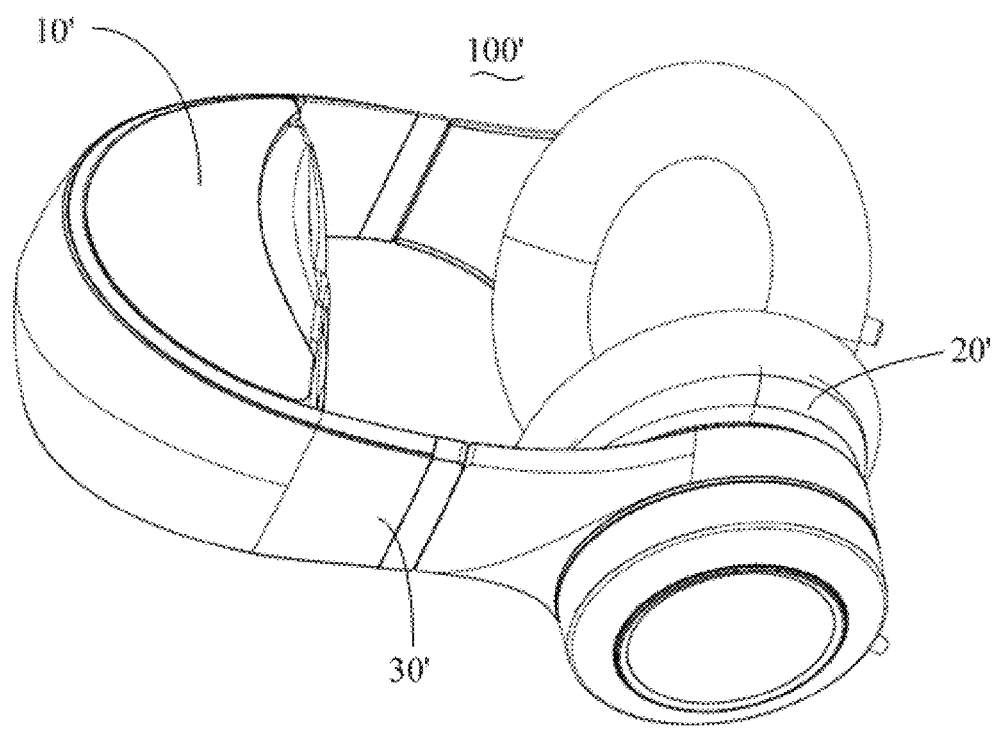
FIG. 7 is a schematic view of a head-mounted display device provided in a second exemplary embodiment of the present disclosure.

As illustrated in FIG. 1 and FIG. 2, a head-mounted display device 100 provided in an embodiment of the present disclosure, includes a display unit 10, a headphone unit 20, and a connecting unit 30. The display unit 10 is configured to project an image beam to user's eyes, thus enabling the user to see an enlarged virtual image. The display unit 10 includes a front surface 12 and a rear surface 14. The front surface 12 includes two windows 16 for the image beam to pass though. The rear surface 14 defines a groove (not shown) in a middle part of the rear surface 14. Internal electronic components of the display unit 10 are connected to other units outside the display unit 10 by a connecting line which passes through the groove, such as a flexible circuit board 18 arranged inside the display unit 10 couples to the headphone unit 20 by the connecting line. The near-eye display technology used by the display unit 10 is a technology well known to those skilled in the art, and will not be described in further details. The headphone unit 20 is configured to transmit sound information to the user's ear. The headphone unit 20 couples to the display unit 10 by the connecting unit 30. In the embodiment, the headphone unit 20 is a headphone, and the headphone unit 20 includes two circumaural headphone elements 22 and a headband 24 coupling the two headphone elements 22. It will be apprehended that, as illustrated in FIG. 7, in other embodiments, a head-mounted display device 100' provided without the headband 24, can still enable the user to see the image displayed by a display unit 10' and to hear the sound transmitted by headphone unit 20', or the headphone unit 20 may be a bone-conduction headphone applied to the head-mounted display device 100'.

The connecting unit 30 is substantially C-shaped and has a middle portion 30a coupling to the display unit 10. The connecting unit 30 defines a C-shaped opening. Two opposite sides 30b, 30c of the C-shaped opening of the connecting unit 30 are respectively connected to the headphone elements 22 of the headphone unit 20. Specifically, the middle portion 30a of the connecting unit 30 defines a fixing member 32b extending towards the C-shaped opening. The fixing member 32b is inserted into the groove, and is fixed with the display unit 10 by means of screws or the like. The groove is defined in the middle part of the rear surface 14 of the display unit 10. That is, parts of the rear surface 14 of the display unit 10 on two opposite sides of the groove along the length direction are not fixed with the connecting unit 30, but in a separable state. In this way, when the two headphone elements 22 are pulled open by the user, the opposite sides 30b, 30c of the connecting unit 30 can move along with the headphone elements 22, thus causing a larger deformation, which is convenient for the user to wear.

Figure 3:
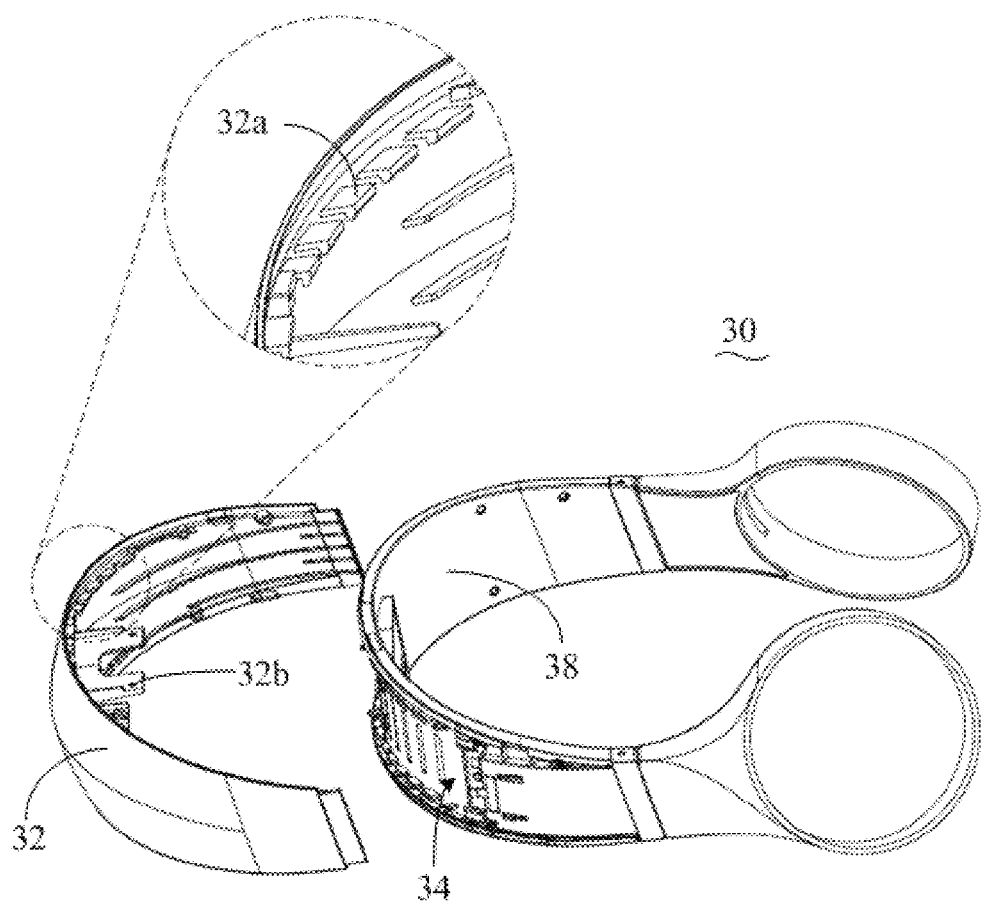
FIG. 3 is a partial disassembly schematic view of the connecting unit of FIG. 2.
Figure 4:
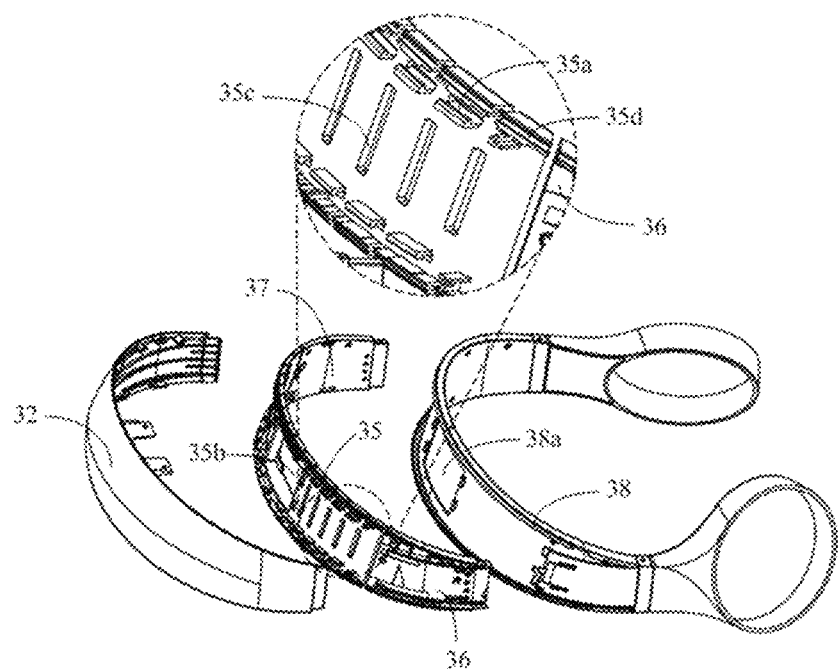
FIG. 4 is another partial disassembly schematic view of the connecting unit of FIG. 2.

As illustrated in FIG. 3 and FIG. 4, specifically, the connecting unit 30 includes an outer frame 32, a connecting assembly 34, and an inner frame 38. The connecting assembly 34 includes a first connecting member 35, a second connecting member 36, and a third connecting member 37, which are independent from each other. The first connecting member 35 is located at the middle portion 30a. The second connecting member 36 and the third connecting member 37 are located adjacent to the opposite sides 30b, 30c, respectively. The first connecting member 35, the second connecting member 36, and the third connecting member 37 are connected to the outer frame 32. The inner frame 38 is connected to the connecting assembly 34. Portions of the inner frame 38 adjacent the opposite sides 30b, 30c are fixed to the outer frame 32, thus sandwiching the connecting assembly 34 between the inner frame 38 and the outer frame 32.

When the user wears the head-mounted display device 100, the two headphone elements 22 need to be pulled apart, and the opposite sides 30b, 30c of the connecting unit 30 are also away from each other accordingly, resulting in the deformation of the connecting unit 30. In the above embodiment, since the connecting assembly 34 comprises the first connecting member 35, the second connecting member 36, and the third connecting member 37 independent from each other, in which the first connecting member 35 is located in the middle portion 30a, and the second connecting member 36 and the third connecting member 37 are located adjacent to the opposite sides 30b, 30c, respectively. Therefore, an elastic force generated by the connecting assembly 34 is much less than that generated by an integral connecting assembly, thus reducing the pull force required to pull two headphone elements 22 apart or the clamping force of the connecting unit 30 applied to the user when the user wears the head-mounted display device 100, and thereby being convenient for users to wear and improving the wearing comfort.

Preferably, the outer frame 32 defines a plurality of first hooks 32a arranged on an inner side of the outer frame 32. The first connecting member 35, the second connecting member 36, and the third connecting member 37 are spaced apart from each other, and at least the first connecting member 35 defines a plurality of second hooks 35a that clamp and are slidable relative to the corresponding first hooks 32a. In the embodiment, only the connecting member 35 is provided with the plurality of second hooks 35a. However, it will be apprehended that, in other embodiments, the second connecting member 36 and the third connecting member 37 may also define the plurality of second hooks 35a in a case of a large sliding range caused by the deformation. In this technical solution, in a condition that the connecting unit 30 is deformed, the first connecting member 35 can be moved to positions close to or far from the second connecting member 36 and the third connecting member 37 by the relative sliding between the plurality of first hooks 32a and the plurality of second hooks 35a, which adapts to the deformation directions and is beneficial to reducing the stress between the outer frame 32 and the connecting assembly 34 during the deformation process, thus reducing a likelihood or a degree of separation between the outer frame 32 and the connecting assembly 34 in a direction close to or far from the user during the deformation process.

Preferably, the outer frame 32 and the connecting assembly 34 can be made of plastic, and their texture is relatively hard, which is beneficial to support an external shape of the frame. While the inner frame 38 can be made of plastic cement, and its texture is relatively soft, which is beneficial to reducing the abrasion caused by relative motion between the display unit 10 and the inner frame 38. More preferably, the fixing member 32b is arranged on the inside of the outer frame 32, and the first connecting member 35 and the inner frame 38 respectively define through holes 35b and 38a corresponding to the fixing member 32b. So, the display unit 10 is directly fixed to the outer frame 32 with higher hardness, which facilitates the fixation between the display unit 10 and the outer frame 32. Of course, in other embodiments, the display unit 10 can also be directly fixed to the connecting assembly 34 or the inner frame 38.

Preferably, the first connecting member 35 defines a plurality of hollows 35c thereon to facilitate its deformation.

Figure 5:
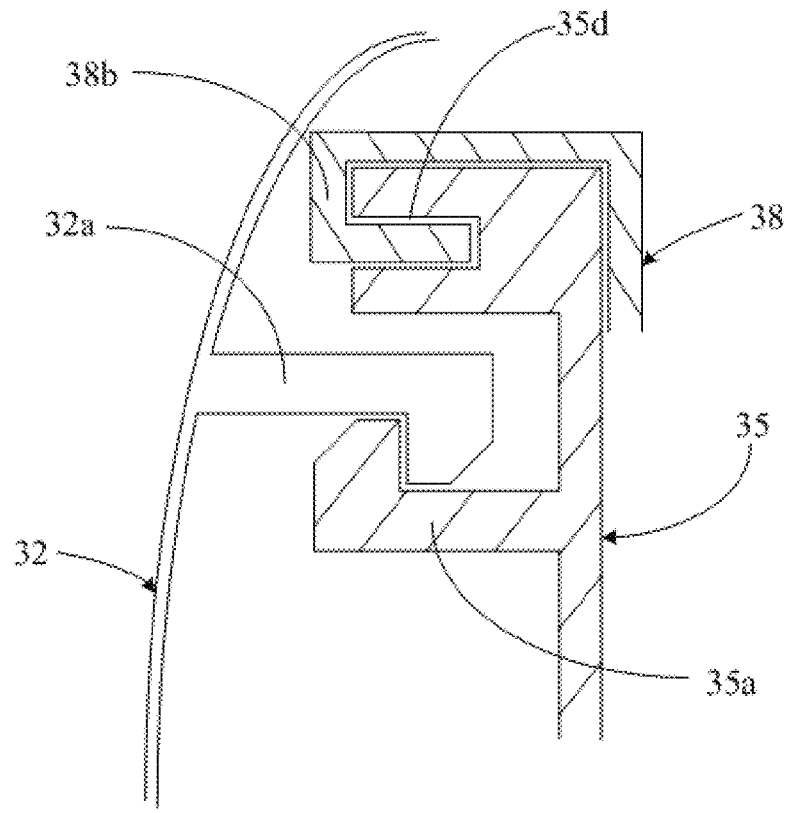
FIG. 5 is a partial cross-sectional view taken along line V-V of FIG. 2.

Specifically, as illustrated in FIG. 5, an up side of the first connecting member 35 defines at least one strip-shaped recess 35d facing the outer frame 32. An up side of the inner frame 38 defines a U-shaped fastener 38b. One end of the fastener 38b extends from the inner frame 38 to the outer frame 32, while the other end of the fastener 38b extends in an opposite direction. The other end of the fastener 38b is clamped into the at least one strip-shaped recess 35d, so that the up side of the inner frame 38 may also substantially cover the up side of the first connecting member 35 when the up side of the inner frame 38 is clamped into the first connecting member 35. The connection between a low side of the first connecting member 35 and a low side of the inner frame 38 is the same as that described above, and is also fastened in the way of clamping the fastener 38b into the at least one recess 35d, which will not be described in further details. Thus, the first connecting member 35 and the inner frame 38 couples each other. The connecting manner between the second connecting members 36 and the inner frame 38 or between the third connecting members 37 and the inner frame 38 can be similar to that described above. The connecting manner between the at least one recess 35d and the U-shaped fastener 38b is configured to make the connecting member 32 and the inner frame 38 to slide relative to each other, thus reducing the stress between the connecting member 32 and the inner frame 38.

Figure 6:
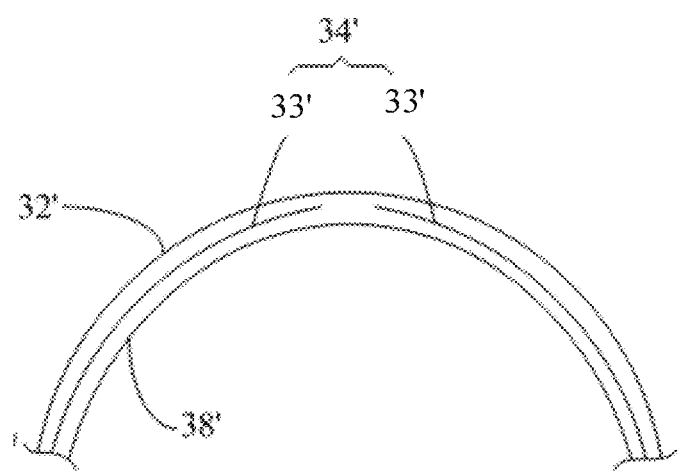
FIG. 6 is a schematic view of another embodiment of the connecting unit of FIG. 2.

It will be apprehended that, in other embodiment, the connecting assembly 34 includes four or more connecting members. For example, the first connecting member 35 can also be disassembled into two pieces to reduce the above-mentioned elastic force after deformation. It will be apprehended that, the connecting assembly 34' can also be divided into only two segments. For example, as illustrated in FIG. 6, a structure of the outer frame 32' and the inner frame 38' of the connecting unit is similar to the above embodiment, and the connecting assembly 34' includes two connecting members 33'. An end of each connecting member 33' adjacent to each of the headphone members 22 of the headphone unit 20 fixes to the outer frame 32', and another end of each connecting member 33' far from each of the headphone members 22 of the headphone unit 20 includes a plurality of first hooks and a plurality of second hooks, thus one end of each connecting member 33' may move relative to the outer frame 32', and thereby achieving the same purpose as the above. The specific structure is similar to the above embodiment, which will not be described in further details.

In the specification and claims, a side of the connecting unit 30 facing towards a space enclosed by the C-shaped opening is defined as an inside, and the opposite side is defined as an outside. The foregoing description merely depicts some exemplary embodiments of the disclosure, which are not intended to limit the disclosure. Any modifications, equivalent substitutions, and improvements made without departing from the principles of the disclosure shall all be encompassed within the protection of the disclosure.

What is claimed is:

1. A head-mounted display device, comprising:
a display unit projecting an image beam to user's eyes, thus enabling the user to see an enlarged virtual image;
a headphone unit configured to transmit sound information to the user's ears; and
a connecting unit being substantially C-shaped and defining a C-shaped opening, a middle portion of the connecting unit coupling to the display unit; wherein two opposite sides of the C-shaped opening of the connecting unit couples to the headphone unit; the connecting unit comprises an outer frame, a connecting assembly, and an inner frame; the connecting assembly comprises at least two independent connecting members; the connecting assembly couples to the outer frame; the inner frame couples to the connecting assembly, and portions near the two opposite sides of the connecting unit of the inner frame fix to the outer frame, thus sandwiching the connecting assembly between the inner frame and the outer frame;
wherein the connecting assembly further comprises a first connecting member located at the middle portion of the connecting unit, and a second connecting member and a third connecting member which are near the two opposite sides of the connecting unit respectively; and
wherein the outer frame comprises a plurality of first hooks arranged on an inner side of the outer frame; the first connecting member, the second connecting member, and the third connecting member are spaced apart from each other; at least the first connecting member defines a plurality of second hooks; and each of the plurality of second hooks is slidable relative to a corresponding first hook when the plurality of second hooks clamp the plurality of first hooks.

2. The head-mounted display device of claim 1, wherein each of the second connecting member and the third connecting member defines at least one second hook that is slidable relative to the corresponding first hook when the at least one second hook clamps the corresponding first hook.

3. The head-mounted display device of claim 1, wherein the middle portion of the connecting unit defines a fixing member; the display unit defines a groove corresponding to the fixing member, and the fixing member receives in the groove and fixes to the display unit.

4. The head-mounted display device of claim 3, wherein a hardness of the outer frame and the connecting assembly is higher than that of the inner frame.

5. The head-mounted display device of claim 4, wherein the outer frame and the connecting assembly are made of plastic, and the inner frame is made of plastic cement.

6. The head-mounted display device of claim 4, wherein the fixing member is arranged on an inside of the outer frame.

7. The head-mounted display device of claim 1, wherein the first connecting member defines a plurality of hollows thereon.

8. The head-mounted display device of claim 1, wherein an up side of the first connecting member defines at least one first strip-shaped recess facing the outer frame, and an up side of the inner frame defines a first U-shaped fastener slidably clamping into the at least one first strip-shaped recess on the up side; a low side of the first connecting member defines at least one second strip-shaped recess facing the outer frame, and a low side of the inner frame defines a second U-shaped fastener slidably clamping into the at least one second strip-shaped recess on the low side.

9. The head-mounted display device of claim 1, wherein the outer frame comprises a plurality of first hooks arranged on an inner side of the outer frame; the connecting assembly comprises two independent connecting members; an end of each connecting member adjacent to the headphone unit fixes to the outer frame, and another end of each connecting member far from the headphone unit comprises a plurality of second hooks, wherein the plurality of second hooks are slidable relative to the plurality of first hooks when the plurality of second hooks clamp to the plurality of first hooks.

* * * * *